(12) United States Patent
Shimura

(10) Patent No.: US 7,900,665 B2
(45) Date of Patent: Mar. 8, 2011

(54) PNEUMATIC TIRE AND METHOD OF MOUNTING TRANSPONDER TO PNEUMATIC TIRE

(75) Inventor: Kazuhiro Shimura, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 1022 days.

(21) Appl. No.: 11/663,290

(22) PCT Filed: Oct. 3, 2005

(86) PCT No.: PCT/JP2005/018285
§ 371 (c)(1),
(2), (4) Date: Mar. 20, 2007

(87) PCT Pub. No.: WO2006/038585
PCT Pub. Date: Apr. 13, 2006

(65) Prior Publication Data
US 2008/0053582 A1    Mar. 6, 2008

(30) Foreign Application Priority Data

Oct. 5, 2004   (JP) ................ 2004-292361
Oct. 5, 2004   (JP) ................ 2004-292363

(51) Int. Cl.
*B60C 23/00*   (2006.01)
*B60C 19/00*   (2006.01)
*B60C 5/00*    (2006.01)
(52) U.S. Cl. ............... 152/152.1; 152/450; 73/146
(58) Field of Classification Search ........... 152/152.1, 152/450; 73/146
See application file for complete search history.

(56) References Cited

U.S. PATENT DOCUMENTS

| 3,764,446 | A | * | 10/1973 | Martin ................. 428/52 |
| 5,657,516 | A | * | 8/1997 | Berg et al. ............. 24/452 |
| 6,030,478 | A | | 2/2000 | Koch et al. |
| 6,217,683 | B1 | * | 4/2001 | Balzer et al. ......... 156/60 |
| 6,257,289 | B1 | | 7/2001 | Tomita et al. |
| 6,788,192 | B2 | | 9/2004 | Shimura |
| 2003/0221766 | A1 | * | 12/2003 | Strache et al. ........ 156/123 |

FOREIGN PATENT DOCUMENTS

| EP | 694861 | * | 1/1996 |
| JP | 11-217010 | * | 8/1999 |
| JP | 11-278021 | | 10/1999 |
| JP | 2600143 | | 10/1999 |
| JP | 002-205516 | | 7/2002 |
| JP | 2002-214060 | | 7/2002 |
| JP | 2002-541003 | | 12/2002 |
| JP | 2003-511287 | | 3/2003 |

* cited by examiner

*Primary Examiner* — Justin Fischer
(74) *Attorney, Agent, or Firm* — Greer, Burns & Crain, Ltd.

(57) ABSTRACT

In a pneumatic tire (20) on which a transponder (1) is mounted, a securing member (3) for securing the transponder (1) is fixed to an inner surface of the tire in an area (S) between a tire maximum-width position (A) and a bead toe (B). Thereby, a large centrifugal force and a large impact force do not act on the transponder (1) storing various pieces of information, and the transponder can be mounted quickly and securely. Also, the weight of the transponder is remarkably reduced, and thus uniformity of the tire (20) is enhanced. Additionally, dynamic balance correction is made easier. Even in a large tire, reduction in durability is minimized through suppressing heat generation and heat accumulation of the tire (20) due to the transponder (1) and the securing member (3).

20 Claims, 18 Drawing Sheets

PNEUMATIC TIRE AND METHOD OF MOUNTING TRANSPONDER TO PNEUMATIC TIRE

TECHNICAL FIELD

The present invention relates to a pneumatic tire to which a member for mounting a transponder is fixed, and a method of mounting the transponder on the pneumatic tire. More specifically, the present invention relates to a pneumatic tire that enables a transponder to be securely mounted thereon, and that enables imbalance in weight to be securely reduced, and the present invention also relates to a method of mounting the transponder on the pneumatic tire. The transponder is that for measuring at least an internal pressure of the tire and for storing various pieces of information. The imbalance in weight is due to a securing member and the transponder.

BACKGROUND ART

Technologies have been actively developed for mounting a transponder on a tire in order for a tire manufacturer to manage its manufacture of a tire, in order for a tire purchaser to manage use history of his/her tire, and in order to manage information on the internal pressure and the temperature of a tire. The transponder includes a reception function, a transmission function and a storage function altogether.

A pressure sensor portion of this transponder for a tire needs to be exposed to an interior of the tire in order to measure a pressure inside an air chamber of the tire. For this reason, unlike a transponder used for ID or a transponder used for ID and a temperature, this transponder cannot be entirely buried in a tire structure.

In a case where a transponder is fixed to an inner surface of a tire by adhesion, there is a possibility that a fixation status thereof is unreliable depending on how the fixation is performed. For this reason, the desired method of mounting a transponder to a tire is a faster and more reliable method that is not adhesion.

A proposed tire for which this mounting method is used is that of Japanese Patent Application Kokai Publication No. 1999-278021, the tire having a monitoring apparatus. In this tire, as shown in FIG. 30, a large housing (a screw member which grasps and secures a transponder 1) 60 configured to embrace the transponder 1 is arranged in an interior of a pneumatic tire 20X on an equatorial plane thereof. The transponder 1 is fixed to the pneumatic tire with this housing 60. A certain effect has been realized by this structure.

In this structure, however, unbalanced tire weight occurring due to the transponder 1 and the screw member is large, the transponder 1 being attached to the interior of the pneumatic tire on the equatorial plane thereof, and the screw member securing the transponder. As a result, correction of the unbalanced weight is extremely difficult, and there is a problem that a tire uniformity is deteriorated.

Particularly, in a case of applying this structure to a large tire used for a truck or the like which continues high-speed traveling with a heavy load for a long time period, more heat is generated and accumulated because of large masses respectively of a transponder and a large screw member with which the transponder is secured. As a result, there is a problem that this leads to reduction in durability of the transponder. There is also a problem that it is difficult to secure the transponder to the pneumatic tire which is made of a rubber member, and which undergoes a relatively large deformation.

DISCLOSURE OF THE INVENTION

The present invention has been made to solve the aforementioned problems, and an object thereof is to provide a pneumatic tire and a method of mounting a transponder on the pneumatic tire, the tire and the method being described below.

The present invention makes it possible to prevent a large centrifugal force and a large impact force from acting upon the transponder mounted on a pneumatic tire, and to remarkably reduce the weight of a transponder for storing various pieces of information and the weight of a securing member for securing the transponder. Thereby, the present invention makes it possible to easily correct a dynamic balance of the tire as well as to enhance uniformity of the tire. Furthermore, the mounting can be done faster and more reliably than through the fixation by adhesion. Even in a case of a large tire, reduction in durability of the tire can be minimized through suppressing heat generation and heat accumulation of the tire due to the transponder and the securing member.

The pneumatic tire for achieving the aforementioned object is that on which a transponder is mounted, and which is characterized in that a securing member for securing the transponder is fixed to an inner surface of the tire in an area between a maximum-width position of the tire and a bead toe.

According to this configuration, the fixation is made in a vicinity of a bead portion on which a relatively small inertial force acts, not to an equatorial plane of the tire on which the largest inertial force acts. Thus, dynamic balance of the tire can be corrected easily. Another preferable feature of this configuration is that, even in a case of installing the transponder in a high-speed traveling vehicle, a centrifugal force which acts upon the transponder, and an impact force due to traveling of the tire are remarkably reduced as compared to a case of installing the transponder on the equatorial plane of the tire. The reason is that the transponder is fixed to the bead portion of the tire which undergoes a relatively small amount of deformation, not to the equatorial plane of the tire which undergoes a relatively large amount of deformation. Accordingly, the large centrifugal force and the large impact force are prevented from acting on the transponder. Moreover, a risk of the transponder falling off is reduced.

In the aforementioned pneumatic tire, when the securing member is formed of a securing screw member, the fixation is made to the tire via the screw member. Hence, the mounting can be done faster and more reliably than through the fixation by adhesion. Moreover, because the method is a mechanical fastening method with a screw, a joining strength can be made stronger than through the fixation by adhesion. As a result, the transponder and a member for securing the transponder can be reduced in size, and it is made possible to remarkably reduce the weights thereof. With this reduction in size and weight, and with arrangement positions thereof, it is made possible to easily correct an amount of dynamic balance of the tire. Thus, uniformity of the tire is enhanced.

When the securing of the transponder to the securing screw member is configured to be performed by screwing a male screw, which is formed in the securing screw member, to a female screw which is a through hole formed in the transponder, the mounting and demounting of the transponder are easier. Moreover, less heat is generated or accumulated in the tire because an outer circumferential portion of the transponder is in a state of constantly being in contact with air in the tire interior. As a result, durability of the transponder is remarkably enhanced.

Otherwise, when the securing of the transponder to the securing screw member is configured to be performed by inserting a mounting screw member into a through hole formed in the transponder, and then by screwing together the mounting screw member and the securing screw member, in particular, also in a case of installing the transponder in a heavily-load high-speed-traveling vehicle, looseness is caused between the mounting screw member and the transponder. For this reason, a large deformation of the tire due to a heavy load influences the transponder less, and it is easier for the transponder to follow tire deformation. Accordingly, a risk of the transponder being destroyed is reduced.

Alternatively, when the securing of the transponder to the securing screw member is configured to be performed by screwing a male screw, which is formed in a bottom surface of the transponder in a way that the male screw projects, into a female screw which is formed in the securing screw member, the mounting and demounting of the transponder are easier. Moreover, less heat is generated or accumulated in the tire because an outer circumferential portion of the transponder is in a state of constantly being in contact with air in the tire interior. As a result, durability of the transponder is remarkably enhanced.

When a material of a portion where the male screw or the female screw is formed is made of metal, resin or fiber-reinforced plastic having a melting point or a softening point of not less than 180° C., the portion where the male screw or the female screw is formed can be adhered to the tire by vulcanization at the same time of the vulcanization of the tire. That is, the securing screw member, the mounting screw member, or a screw portion can be adhered to the tire by vulcanization. Accordingly, it is made possible to fix these portions strongly, and a risk of the transponder falling off is reduced as a result.

Moreover, the aforementioned pneumatic tire is configured in a way that the securing screw member is mounted on an inner surface of an unvulcanized tire with a patch of unvulcanized rubber. The patch is fixed to the inner surface of the tire along with vulcanization of the tire. Thereby, the securing screw member is fixed to the tire. Otherwise, the securing screw member is mounted on an inner surface of a vulcanized tire with a patch of unvulcanized rubber or of vulcanized rubber, and the patch is fixed to the tire with adhesion. Thereby, the securing screw member is fixed to the tire. In any one of these cases, the securing screw portions can be adhered to the tire concurrently when vulcanization of the tire occurs. Thus, it is made possible to fix these portions strongly, and thus to reduce a risk of the transponder falling off.

It is possible to measure uniformity of the tire after vulcanization, to select a part opposite to a part where unbalanced weight is large, and to fix the transponder and the securing screw member to each other. Thereby, uniformity of the tire can be enhanced.

Alternatively, when the aforementioned pneumatic tire is configured in a way that the securing screw member is buried inside the tire before the vulcanization of the tire, a patch is unnecessary, and a number of parts is reduced. Along with this, the securing screw member can be fixed more strongly. Hence, the securing screw member can be further reduced in size and weight.

When the aforementioned pneumatic tire is configured in a way that an end portion, which is opposite to the tip of the securing screw member is provided with fall-out prevention member, a strong resistance can be generated in the securing screw member against the force causing the transponder to fall off. Even in a case of installing a transponder in a heavily-load high-speed-traveling vehicle, the strong resistance is caused by the member which prevents the transponder from falling off, and which is each formed of a yoke or a flange. Accordingly, it is possible to prevent the securing screw member from being separated from the tire, and to prevent the tire from being destroyed as a result of the securing screw member being compressed toward a structure of the tire (toward an outside of the tire), on the contrary. Thus, a risk of the transponder falling off due to a centrifugal force, which is generated by rotation of the tire, and which acts on the transponder, is reduced.

When the aforementioned pneumatic tire is configured in a way that the fall-out preventing member of the securing screw member is fixed to an area between the inner surface of the tire and a surface of a bead filler at the side of a carcass, the securing screw member is fixed strongly to the tire, and the transponder is grasped strongly by this securing screw member. Accordingly, a risk of the transponder falling off is reduced even in a case where a strong external force acts on the tire, such as in a case where the tire collides with a curbstone.

Furthermore, the pneumatic tire of the present invention for achieving the above object is that on which a transponder is mounted, and which is characterized in that the securing member is formed of at least one string-shaped projection member for securing a transponder having at least one through hole.

With this structure, it is made possible to remarkably reduce the weight of the transponder which stores various pieces of information, and the weight of a member for securing the transponder. Thereby, a uniformity performance of the tire can be enhanced.

In the aforementioned pneumatic tire, the mounting of the transponder is reliably mounted on the tire when the tire is configured as follows. The transponder is caused to pass through the string-shaped projection member integrally molded with the string-shaped projection member including a patch portion and a string-shaped projection portion which projects from the patch portion. The patch portion is caused to project from the inner surface of the tire while the patch portion is previously secured to an inner liner of the pneumatic tire. Moreover, influence by heat in the tire generated and accumulated is reduced because an outer circumferential portion of the transponder is in a state of constantly being in contact with air in the tire interior. Thus, durability performance of the transponder is remarkably enhanced.

When the aforementioned pneumatic tire is configured in a way that the string-shaped projection portion is provided with a fall-out preventing portion, which expands and contracts due to elastic deformation thereof, while an outer diameter of the string-shaped projection portion is formed in a way that the portion is smaller than the through hole of the transponder, the transponder is strongly fixed to the pneumatic tire only by passing the string-shaped projection portion through the through hole of the transponder, and by causing the string-shaped projection portion to extend beyond the fall-out prevention portion when the transponder is mounted. Hence, the transponder can be mounted on the pneumatic tire easily and reliably without a tool. Accordingly, a risk of the transponder falling off is reduced. The fall-out prevention portion can be formed, for example, of a shape of a truncated cone turned up-side-down, the portion having an outer diameter larger than the diameter of the through hole.

In the aforementioned pneumatic tire, when the string-shaped projection member is formed of elastomer, it is made possible to enable deformation of the string-shaped projection member to absorb vibration and deformation of the tire. As a result, a risk of the transponder falling off is reduced. Note that it is preferable that a length from the patch portion of the string-shaped projection member to the fall-out prevention portion thereof be equal to, or approximately 10% shorter than, a depth of the through hole of the transponder. Furthermore, from the aspect of mounting workability, it is preferable that a length from the fall-out prevention portion to a tip (an end at an open side of the inner surface of the tire) of the string-shaped projection portion be not less than 50% shorter than the depth of the through hole of the transponder.

Furthermore, when the aforementioned pneumatic tire is configured in a way that the string-shaped projection member is formed of a thermoplastic elastomer, and is deformed by heating after the string-shaped projection member is passed through the through hole of the transponder, a width of a tip part of the string-shaped projection member can be made larger than the through hole of the transponder due to thermal deformation of the tip part of the string-shaped projection portion. Thereby, it is made possible to fix the transponder more strongly. As a result, a risk of the transponder falling off is reduced.

Here, the thermoplastic elastomer means a high-polymer material which can be processed by heating because it shows rubber elasticity at room temperature, and plasticizes at a high temperature. As this high-polymer material, for example, one which is olefin-based, styrene-based, ester-based, urethane-based, amide-based, vinyl-chloride-based or the like can be used as appropriate. By blending one polymer material with another, it is also made possible to impart larger rubber elasticity thereto, and to improve a physical characteristic such as thermal resistance.

When the string-shaped projection member is formed of PP (polypropylene) or EPDM (polyolefin), it is easily possible to cut the string-shaped projection portion by melting it with a heating apparatus such as an electrically-heated iron, and to provide a ball-shaped projection on a fracture surface. As a result, it is made possible to fix the transponder to the tire more reliably. In addition, it is made easily possible to fuse a plurality of stripe-shaped projection portions with the transponder by heating.

Moreover, it is made possible to fix the transponder to the tire more reliably when the aforementioned pneumatic tire is configured in a following manner. At least two of the string-shaped projection portions are installed, and, are passed through the through holes of the transponder. Thereafter, the string-shaped projection portions are caused to overlap with each other, and are fused with each other by heating with a heating apparatus. Particularly, even in a case of a pneumatic tire for a passenger car which may travel at a high speed, and which undergoes a large deformation of the tire, the transponder can be fixed to the tire strongly. Accordingly, a durability performance is enhanced.

Furthermore, in the aforementioned pneumatic tire, it is made possible to fix the transponder to the tire more reliably when the aforementioned pneumatic tire is configured in a following manner. A groove is portion provided to the transponder. After being passed through the through holes of the transponder, the string-shaped projection portions are arranged in the groove portion, and are caused to overlap with each other. Thereafter, the overlapped portions are fused to each other through heating. Particularly, even in a case of a pneumatic tire for a passenger car which may travel at a high speed, and which undergoes a large deformation of the tire, the transponder can be secured to the tire strongly. For this reason, a durability performance can be enhanced.

When the aforementioned pneumatic tire is configured in a way that a communication frequency of the transponder is set at not less than 300 MHz and not more than 3 GHz, the transponder is less susceptible to an internal structure of the tire even in a case of installing what is termed as a high-performance transponder which functions with an external transmission energy. Thus, favorable energy transmission efficiency from a readout unit can be enjoyed. Since a communication frequency of not less than 300 MHz and not more than 800 MHz is more efficient, it is more preferable that this communication frequency be used.

A method of mounting a transponder to a pneumatic tire for achieving the aforementioned object is characterized as follows. A string-shaped projection member is fixed to an inner liner of the tire by the joining of the patch portion. The string-shaped projection member includes at least one string-shaped projection portion and the patch portion, and is integrally molded. Thereafter, the string-shaped projection member is passed through the through hole of the transponder, and the transponder is secured between a patch portion and a fall-out preventing portion provided in the middle of the string-shaped projection portion.

Alternatively, the method is characterized as follows. A string-shaped projection member is fixed to an inner liner of the tire by the joining of the patch portion. The string-shaped projection member includes at least one string-shaped projection portion and a patch portion, and is integrally molded of a thermoplastic elastomer. Thereafter, the sting-shaped projection member is passed through the through hole of the transponder, and a tip of the string-shaped projection member is deformed by heating. Thereby, the transponder is secured between the patch portion and the portion deformed by heating.

Alternatively, the method is characterized as follows. A string-shaped projection member is fixed to an inner liner of the tire by the joining of the patch portion, the string-shaped member including at least two string-shaped projection portions and a patch portion, and being integrally formed of a thermoplastic elastomer. Thereafter, the string-shaped projection members are passed through the through hole of the transponder, and tips of the respective string-shaped projection members are caused to overlap with each other. After that, the overlapped parts are joined to each other through fusing by heating with a heating apparatus. The transponder is secured with this joining.

According to each of these methods of mounting a transponder to a pneumatic tire, the mounting of the string-shaped projection member on the tire is made reliable. Moreover, the transponder is fixed to the tire via the string-shaped projection member. As a result, it is made possible to obtain the pneumatic tire which is lightweight, and is favorable in durability performance.

Furthermore, it is made possible to easily mount a transponder for a pneumatic tire and with a through hole, and to reliably fix the transponder to the tire. For this reason, a risk of the transponder falling off is reduced in a case where a large external force acts on the transponder.

In the aforementioned methods of mounting a transponder to a pneumatic tire, when a communication frequency of the transponder is set at not less than 300 MHz and not more than 3 GHz, the transponder is less susceptible to an internal structure of the tire even in a case of installing what is termed as a high-performance transponder which functions with an external transmission energy. Thus, favorable energy transmission efficiency from a readout unit can be enjoyed. Since a communication frequency of not less than 300 MHz and not more than 800 MHz is more efficient, it is more preferable that this communication frequency be used.

According to the pneumatic tire and the method of mounting a transponder on a pneumatic tire, a large centrifugal force and a large impact force can be prevented from acting upon the mounted transponder, and the weight of a transponder and the weight of a securing member for securing the transponder can be remarkably reduced. Accordingly, uniformity of the tire can be enhanced. In addition, correction of a dynamic balance of the tire is made easy.

Furthermore, the transponder and the securing member do not cause much heat generation or heat accumulation of the tire even in a case of a large tire. Thereby, reduction in durability can be suppressed to the minimum.

In a case where a securing screw member is used for the securing member, the mounting can be done faster and more reliably than through the fixation by adhesion. Moreover, with a mechanical fastening method by a screw, a joining strength can be made stronger than through the fixation by adhesion.

BRIEF DESCRIPTION OF THE DRAWINGS

FIG. 2A is a perspective view including a partial notch of the transponder which has a through hole on which a female screw is formed; FIG. 2B is a perspective view of the securing screw member which has a fall-out prevention member; and FIG. 2C is a perspective view of the securing screw member which has a fall-out prevention member in a shape different from that of FIG. 2C.

FIG. 3A is a perspective view of a mounting screw member; FIG. 3B is a perspective view including a partial notch of the transponder which has a through hole; and FIG. 3C is a perspective view of the securing screw member which has a female screw having a fall-out prevention member.

FIG. 5A is a view showing the state before vulcanization; and FIG. 5B is a view showing the state where rubber around the male screw of the securing screw member is removed after vulcanization.

FIG. 6A is a view showing the state where the securing screw member is bonded with a patch; and FIG. 6B is a view showing the state where the securing screw member is bonded at the time of vulcanization.

BEST MODE FOR CARRYING OUT THE INVENTION

Descriptions will be now provided for the present invention with reference to the drawings. However, the present invention is not limited to the following examples of the respective embodiments, and can be executed with various modifications applied thereto within the scope of claims.

First, pneumatic tires respectively of first to third embodiments will be described.

Figure 1:
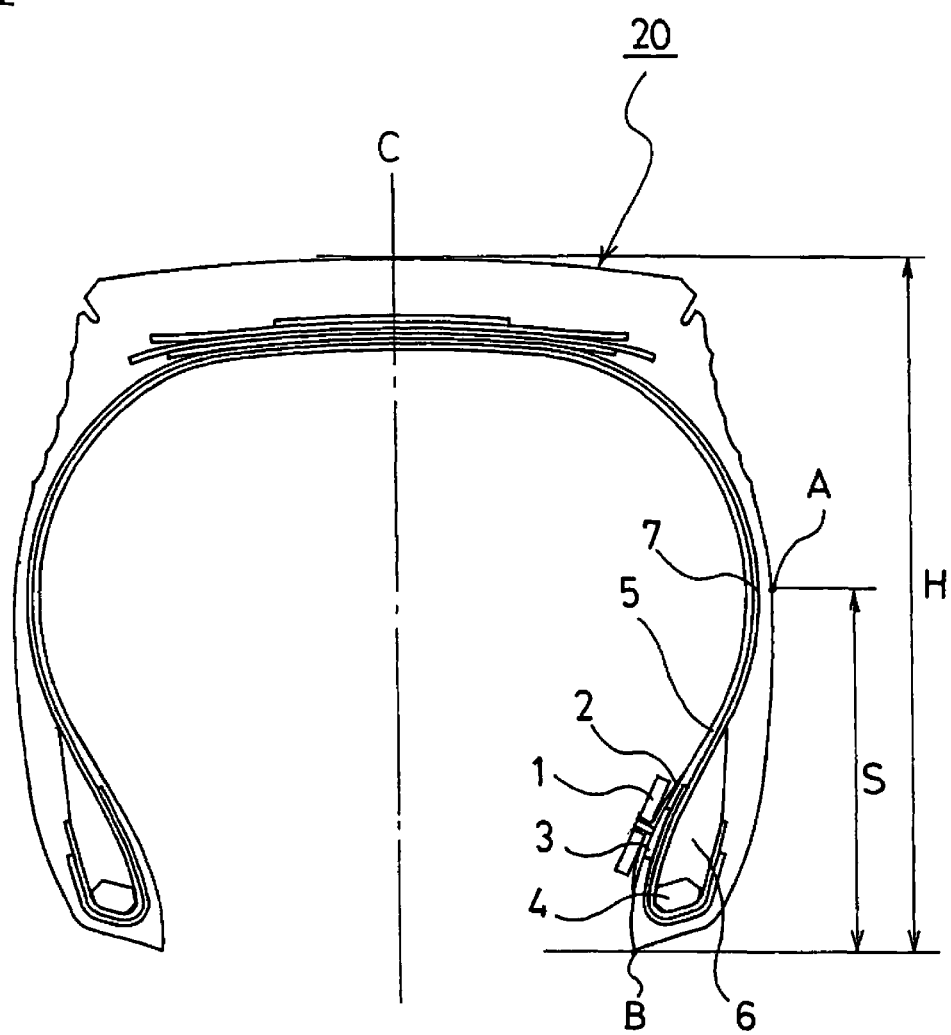
FIG. 1 is a cross-sectional view of a tire in a diametrical direction thereof, the view showing a configuration of a pneumatic tire of a first embodiment of the present invention.

As shown in the cross sectional view of FIG. 1 showing a tire in a diametrical direction thereof, a pneumatic tire 20 of the first embodiment of the present invention is composed in the following manner. A transponder 1 having a through hole 14 is fixed to an inner surface of the tire situated in an area S between a maximum-width position A of the tire and a bead toe B, the transponder being screwed to a securing screw member (a securing member) 3 secured to the pneumatic tire 20. This securing screw member 3 is fixed, with a patch 2, to a recessed portion of an inner liner 5 of the inner surface of the tire of a carcass 7 which surrounds a bead 4 and a part of a bead filler 6. Note that H denotes a height of a cross section of the tire.

By mounting the transponder 1 in this position, the weight of the transponder 1 and of the securing screw member 3, which act as unbalanced weight against tire uniformity is arranged in the vicinity of a tire bead portion while arranging them on an equatorial plane of the tire is avoided. When the pneumatic tire 20 rotates, an inertial force is the largest on the tire equatorial plane whereas an inertial force is relatively small in the vicinity of the tire bead portion. Thus, even in a case of installing the transponder 1 in a high-speed traveling vehicle, a centrifugal force acting upon the transponder 1 and an impact force due to traveling of the tire are remarkably reduced as compared to a case of installing the transponder on the equatorial plane of the tire. Accordingly, the large centrifugal force and the large impact force are prevented from acting upon the transponder 1.

In this pneumatic tire 20, because the transponder 1 is fixed to the inner surface of the tire via the securing screw member 3, the transponder 1 and the securing screw member 3 for securing this transponder 1 can be reduced in size as well as in weight. For this reason, a risk of the transponder 1 falling off can be remarkably reduced.

Another preferable feature of this configuration is that the weight itself, which is arranged in order to maintain a dynamic balance of the pneumatic tire 20, can be reduced, and thus the dynamic balance can be corrected relatively easily. For this reason, uniformity of the tire can be enhanced with facility.

Next, this transponder 1 and the securing screw member 3 will be described. As shown in the perspective view of FIG. 2A including a partial notch portion of the transponder, the transponder 1 of the first embodiment is formed in a disc shape having a chip 10 and an antenna coil 11 which are arranged on a circuit board 12, and which are entirely covered with coating resin 13. Moreover, the transponder 1 has the through hole 14 in the center thereof, and a female screw F is formed on the through hole 14.

When a communication frequency of the transponder is set at not less than 300 MHz and not more than 3 GHz, the transponder is less susceptible to an internal structure of the tire even in a case of installing what is termed as a high-performance transponder which functions with an external transmission energy. Thus, favorable energy transmission efficiency from a readout unit can be enjoyed. In addition, it is more efficient when the communication frequency is set at not less than 300 MHz and not more than 800 MHz, and it is therefore more preferable.

Figure 2A:
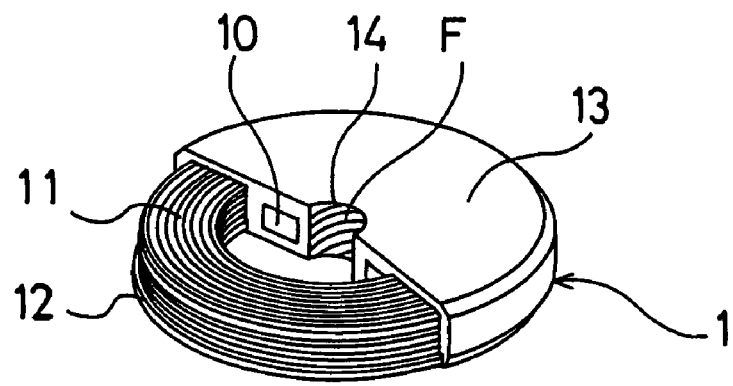
FIGS. 2A to 2C are views showing configurations respectively of a transponder and of securing screw members of the first embodiment.
Figure 2B:
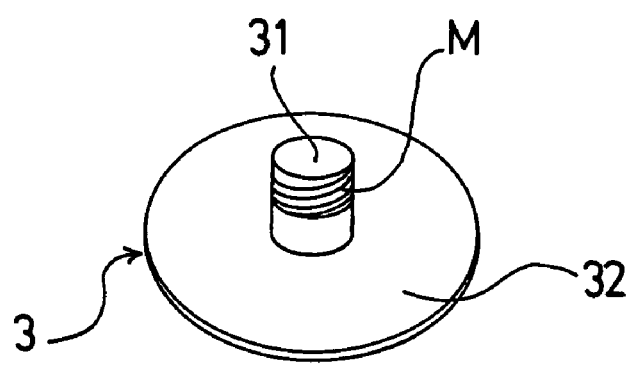

As shown in the perspective view of FIG. 2B, the securing screw member 3 includes a screw portion 31 in the center thereof and a fall-out preventing member 32. A male screw M is formed on the screw portion 31 in the center of the securing screw member 3. The fall-out preventing member 32 has a yoke or a flange on an end portion opposite to a tip of the male screw of the screw portion 31.

Figure 2C:
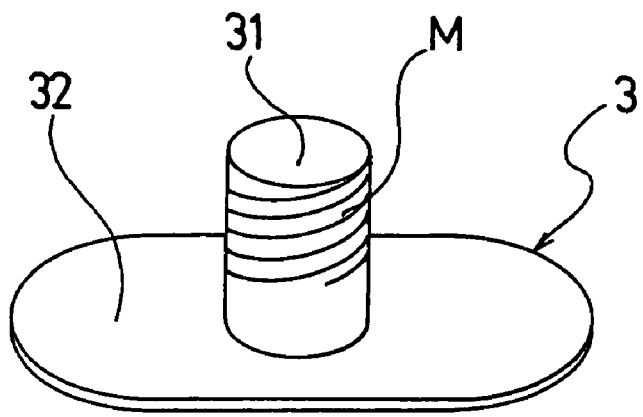

Note that a shape of this fall-out prevention member 32 is not limited to a circular form, and may be formed into a shape such as one obtained by adding semicircles respectively to the two ends of a rectangle, as shown in FIG. 2C. Alternatively, the fall-out prevention member 32 may be formed into a shape of a round-oblong shape, an elliptical shape, a square, a rectangle, a polygon or the like, or may be a styloid extending radially, or the like. In a case of this elongated fall-out prevention member 32, it is fixed in a state where a longitudinal direction thereof is oriented along a circumferential direction of the tire.

With this configuration, the securing screw member 3 is fixed to the tire inner surface more strongly. Thus, it is possible to prevent the securing screw member 3 from being separated from the tire, and to prevent the tire from being destroyed as a result of the securing screw member 3 being compressed toward a structure of the tire (toward an outside of the tire). Even in a case of installing the transponder 1 in a tire for a heavily-load high-speed-traveling vehicle, a strong resistance can be generated against a force causing the securing screw member 3 to fall of with the effect of the fall-out preventing member 32. Accordingly, a risk of the securing screw member 3 and the transponder 1 secured thereto from falling off due to a centrifugal force is reduced, the centrifugal force being generated by rotation of the tire, and acting on the transponder 1.

This transponder 1 is fixed to the bead portion of the pneumatic tire 20 by screwing the male screw M of the securing screw member 3 into the female screw F of the transponder 1.

With this configuration, it is made possible to remarkably reduce the weight of the transponder 1 which stores various pieces of information, and the weight of the securing screw member 3 which secures the transponder 1. Accordingly, uniformity of the pneumatic tire 20 can be enhanced.

Figure 3A:
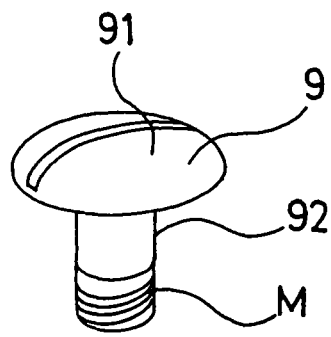
FIGS. 3A to 3C are views showing configurations respectively of a transponder and of securing screw members of a second embodiment.

In the second embodiment, by using a mounting screw member 9 formed of a screw head 91 and a screw portion 92 as shown in the perspective view of FIG. 3A, a transponder 1A (shown in the perspective view of FIG. 3B including a partial notch portion) having a through hole 14A is mounted onto a securing screw member 3A (shown in FIG. 3C) having the female screw F.

Figure 3B:
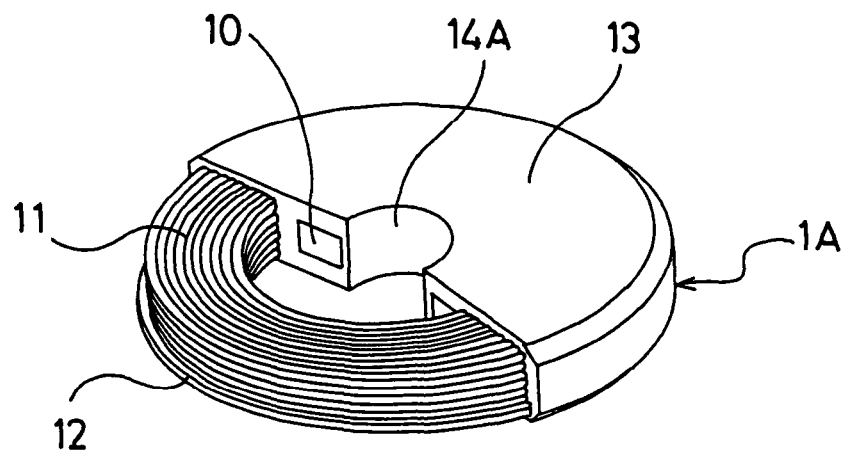

A shape of the screw head 91 of this mounting screw member 9 is not limited to a disc shape, and may be of a suitable shape as appropriate, such as a rectangular-plate shape or a hexagonal-plate shape. A material for the screw head 91 can also be selected as appropriate. However, synthetic resin that is lightweight is preferable. As shown in FIG. 3B, the transponder 1A is formed in a disc shape having the chip 10 and the antenna coil 11 which are arranged on the circuit board 12, and which are entirely covered by the coating resin 13. Moreover, the transponder 1A has the through hole 14 at the center thereof.

In this second embodiment, a screw is not applied to the through hole 14A of the transponder 1A. Furthermore, as shown in the perspective view of FIG. 3C, the mounting screw member 3A has the fall-out prevention member 32, and the female screw F is formed on the screw portion 31A protruding from the center of this fall-out prevention member 32.

The transponder 1A having the through hole 14A is fixed by the male screw M of the mounting screw member 9 screwed into the female screw F of the securing screw member 3A, the male screw M passing through the through hole 14A.

With this configuration, the similar effect can be obtained as in the case with the first embodiment. Furthermore, a risk of the transponder 1A destroyed is reduced even in a case of installing the transponder 1A in a heavily-load high-speed-traveling vehicle. That is, because a gap is made between the through hole 14A of the transponder 1A and the mounting screw member 9, the transponder 1A and the securing screw member 3A both move easily along with a large deformation of the pneumatic tire 20 due to a heavy load thereto.

Figure 3C:
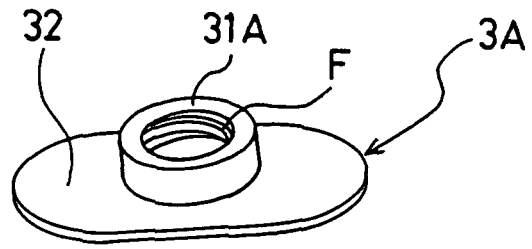
Figure 4:
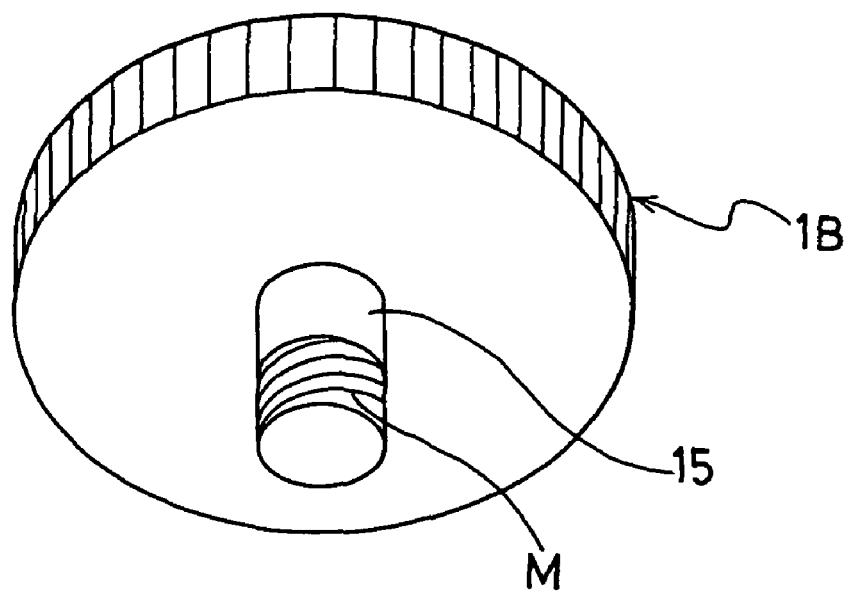
FIG. 4 is a perspective view showing a configuration of a transponder of a third embodiment.

In the third embodiment, as shown in FIG. 4, a transponder 1B is formed with a screw portion 15 provided thereto, and is fixed by the male screw M of this screw member 15 screwed into the female screw F of the securing screw member 3A, as shown in the perspective view of FIG. 3C, the screw portion 15 having the male screw M on a central portion of a lower surface thereof.

Incidentally, as a modification of the above, the transponder 1B may be configured to be fixed by the female screw F screwed onto the male screw M of the securing screw member 3, as shown in FIGS. 2B and 2C while the screw portion 15 of the transponder 1B is formed in a cylinder having the female screw F.

Next, the securing of the securing screw member 3 or 3A to the pneumatic tire 20 will be described. In this securing of the securing screw member 3 or 3A, the fall-out prevention member 32 is configured to be fixed in an area between the inner surface of the tire and a surface of a bead filler 6 at the side of the carcass 7. Thereby, the securing screw member 3 or 3A is strongly fixed to the pneumatic tire 20. For this reason, even in a case where a strong external force acts on the pneumatic tire 20, such as in a case where the tire collides with a curbstone, it is possible to reduce a risk of the transponder 1, 1A or 1B falling off, the transponder 1, 1A or 1B being strongly grasped by this securing screw member 3 or 3A.

Figure 5A:
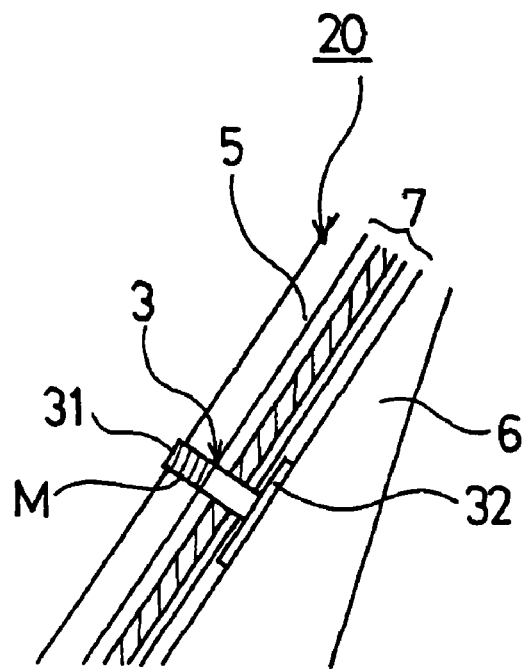
FIGS. 5A and 5B are cross sectional views of a tire in a diametrical direction thereof, the views respectively showing states where a securing screw member having a male screw is secured.
Figure 5B:
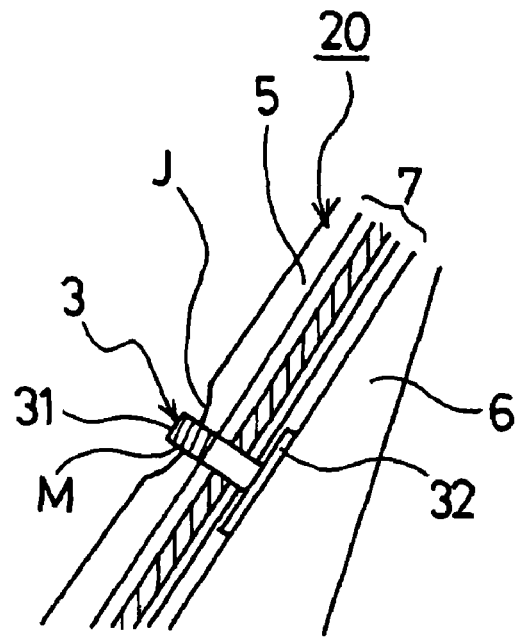

In a case of the securing screw member 3 having the male screw M, the securing screw member 3 is previously buried within the unvulcanized tire as shown in FIG. 5A in a way that the inner surface of the tire and a tip of the screw portion 31 are substantially on the same plane in a tire vulcanization step. Thereafter, surrounding rubber J around the securing screw member 3 is removed as shown in FIG. 5B after vulcanization of the tire.

Figure 6A:
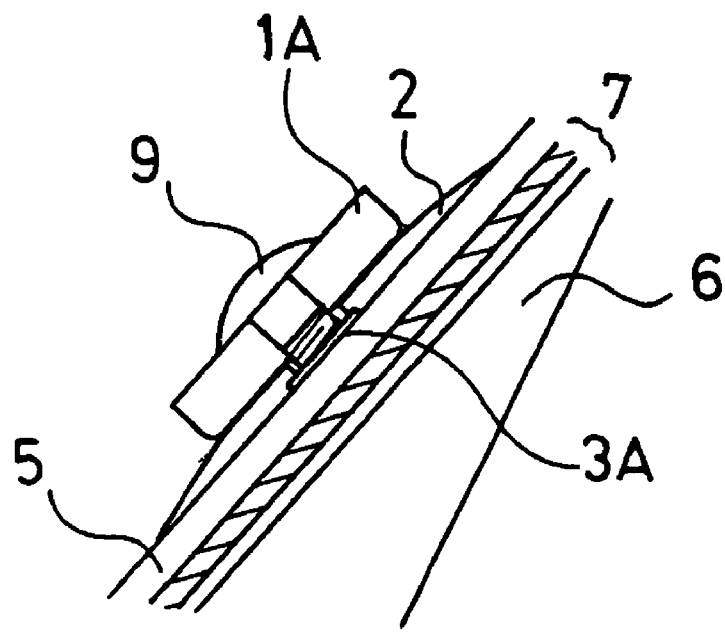
FIGS. 6A and 6B are cross-sectional views of a tire in a diametrical direction thereof, the views respectively showing states where a securing screw member having a female screw is secured.
Figure 6B:
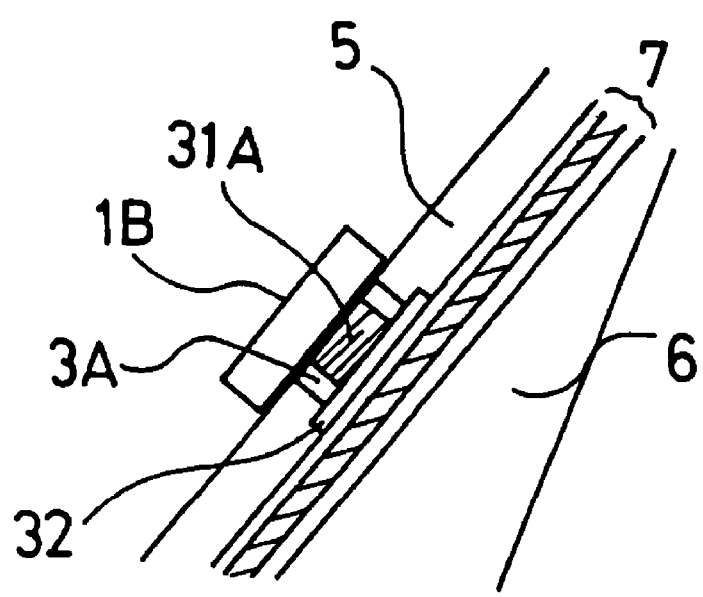

In a case of the securing screw member 3A having the female screw F, the securing screw member 3A is arranged in a manner that the securing screw member 3A abuts a top surface of the inner liner 5 as shown in FIG. 6A. An upper part thereof is covered with the patch 2. This patch 2 is adhered to the inner liner 5. Alternatively, the patch 2 is buried as shown in FIG. 6B in a way that the inner surface of the tire and a point of the screw portion 31A are substantially on the same plane in a tire vulcanization step.

Moreover, a material for at least the securing screw member 3 or 3A is formed of metal, resin or fiber-reinforced plastic having a melting point or a softening point of not less than 180° C. Preferably, a material for a portion where the male screw or the female screw is formed, that is, for the securing screw member 3 or 3A, the mounting screw member 9, and the screw portion 31 or 31A are formed of the foregoing material.

With this configuration, the portion of the securing screw member 3A or the like where the male screw or the female screw is formed can be adhered to the pneumatic tire 20 at the time of vulcanization. Thereby, it is made possible to fix the transponder 1 or 1A strongly. Thus, the risk of the transponder 1 or 1A falling off can be reduced significantly. Incidentally, in a case where rubber intrudes the portion of the female screw F of the securing screw portion 31A or the like during vulcanization, the rubber is removed before mounting the transponder 1A or 1B.

With this configuration in which the adhering is performed during vulcanization, the securing screw member 3 or 3A for securing the transponder 1 or 1A can be fixed to the pneumatic tire when the tire is in an unvulcanized state. In addition, it is made possible to bury the fall-out prevention member 32 within the tire. Accordingly, there is an advantage that an auxiliary member such as the patch 2 is not needed.

Next, fourth to seventh embodiments will be described.

In the fourth embodiment, as shown in the cross sectional view of FIG. 7 of a tire in a diametrical direction thereof, the pneumatic tire 20 of the present invention is configured in the following manner. The transponder 1A having a through hole is fixed to the inner surface in an area S between a maximum-width position A of the tire and the bead toe B by use of a string-shaped projection member (a securing member) 40. The string-shaped projection member 40 for mounting the transponder 1A is fixed, with a patch portion 41, to the inner liner 5 located at a side of the carcass 7 surrounding the bead 4, the side facing an inner periphery of the tire. Note that H denotes a height of the tire.

By mounting the transponder 1A on this position, the weight of the transponder 1A and the string-shaped projection member 40 which act as unbalanced weight against tire uniformity are arranged in the vicinity of the tire bead portion while arranging them on the equatorial plane of the tire is avoided. When the pneumatic tire 20 rotates, an inertial force is the largest on the equatorial plane of the tire, whereas an inertial force is relatively small in the vicinity of the bead portion of the tire. Thus, even in a case of installing the transponder 1A in a high-speed traveling vehicle, a centrifugal force acting upon the transponder 1A and an impact force due to traveling of the tire are remarkably reduced as compared to a case of installing the transponder 1A on the equatorial plane of the tire. Accordingly, the large centrifugal force and the impact force are prevented from acting upon the transponder 1A.

In this pneumatic tire 20, because the transponder 1A is fixed to the inner surface of the tire via the string-shaped projection member 40, the transponder 1A and the string-shaped projection member 40 for securing this transponder 1A can be reduced in size, and the weight thereof can be remarkably reduced. Hence, a risk of the transponder 1A falling off can be remarkably reduced.

In addition, this configuration is preferable in that, because the weight itself arranged in order to maintain a dynamic balance of the pneumatic tire 20 can be reduced, the dynamic balance can be corrected relatively easily. Hence, tire uniformity can be enhanced easily.

Next, descriptions will be provided for the transponder 1A, the string-shaped projection member 40, and a method of mounting the transponder 1A.

Figure 8:
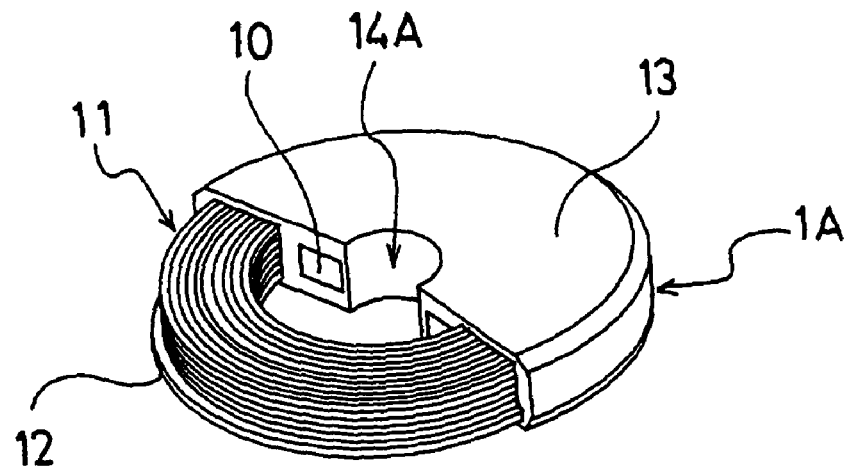
FIG. 8 is a perspective view including a partial notch of a transponder of the fourth embodiment.

This transponder 1A of the fourth embodiment is shown in FIG. 8. This transponder 1A is identical to the transponder 1A of the second embodiment. In this transponder 1A, as shown in the perspective view including a partial notch portion, the antenna coil 11 and the chip 10 are arranged on the circuit board 12. The transponder 1A is formed with the coating resin 13 entirely covering thereof, and the through hole 14A is provided at the center thereof. A shape of this transponder 1A is not limited to a disc shape, and may be an appropriate shape such as a rectangular-plate shape or a hexagonal-plate shape. Additionally, a material for the transponder 1A can also be as appropriate. However, it is preferable that synthetic resin that is lightweight be used, if possible.

When a communication frequency of the transponder 1A is set at not less than 300 MHz and not more than 3 GHz, the transponder 1A is less susceptible to an internal structure of the tire even in a case where what is termed as a high-performance transponder which functions with an external transmission energy is mounted. Thus, favorable energy transmission efficiency from a readout unit can be enjoyed. It is efficient when the communication frequency is set at not less than 300 MHz and not more than 800 MHz, and it is therefore more preferable that this frequency be used.

Figure 9:
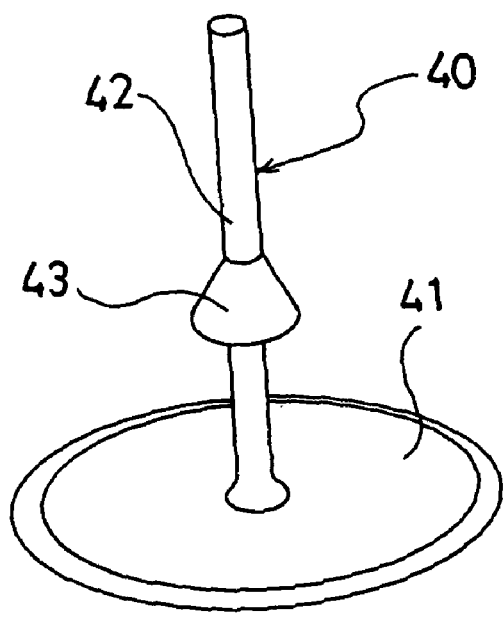
FIG. 9 is a perspective view of a string-shaped projection member for mounting a transponder of the fourth embodiment.

As shown in FIG. 9, the string-shaped projection member 40 is formed of synthetic resin such as elastomer, and is composed of the patch portion 41, a string-shaped projection portion 42 and a fall-out preventing portion 43. This string-shaped projection member 40 is manufactured by being integrally molded. The string-shaped projection portion 42 is formed to have an outer diameter smaller than an inner diameter of the through hole 14A. Furthermore, the fall-out prevention portion 43 is formed in the middle of the string-shaped projection portion 42 in a way that a diameter thereof can be contractible with elastic deformation. For example, the fall-out prevention portion 43 is formed as a return portion shaped in a truncated cone whose bottom edge has an outer diameter larger than the inner diameter of the through hole 14A. Preferably, the section of the string-shaped projection portion 42 from the fall-out prevention portion 43 to a tip (a free edge) of the string-shaped projection portion 42 is preferably made longer than a thickness of the transponder 1A.

By forming the string-shaped projection portion 42 in a way that the string-shaped projection portion 42 is extensible, and by making it rather long, it is made easier to pull the tip of the string-shaped projection portion 42 when the transponder 1A is installed. Thereby, it is made easier to insert the fall-out prevention portion 43 through the through hole 14A of the transponder 1A. Concurrently, it is made possible to mount the transponder 1A reliably as well as easily without a tool. Moreover, the transponder 1A can be grasped strongly with elastic expansion and contraction of the string-shaped projection portion 42.

Figure 10:
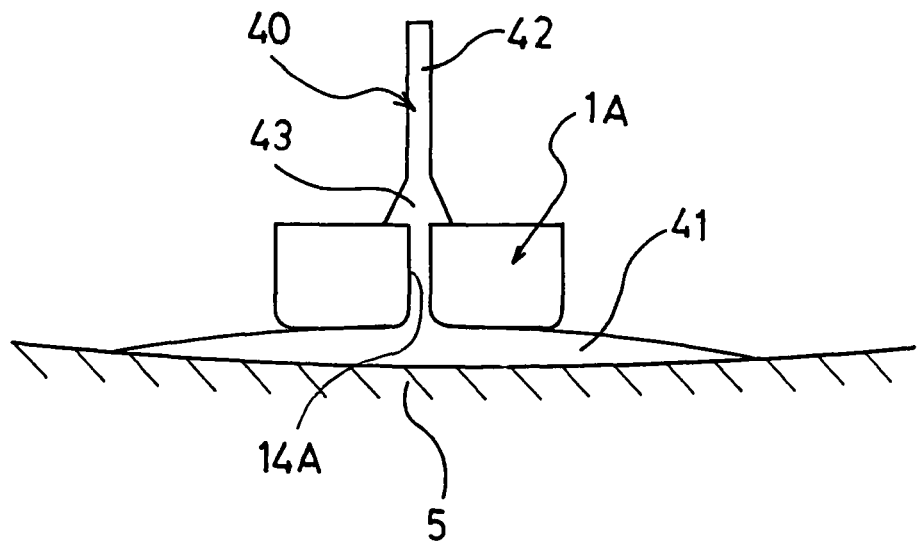
FIG. 10 is an enlarged view of a cross-sectional view in the direction of the tire diameter, the view showing a state where the transponder of the fourth embodiment is mounted.

As shown in an enlarged partial view of FIG. 10 of the cross section in the direction of the tire diameter, the string-shaped projection portion 42 is passed through the through hole 14A of the transponder 1A. The transponder 1A is then pushed toward the patch 41 beyond the return portion of the fall-out prevention portion 43. Thereby, the transponder 1A is secured between the fall-out prevention portion 43 and the patch portion 41.

With this configuration, it is made possible to remarkably reduce the weight of the transponder 1A which stores various pieces of information, and the weight of the string-shaped projection member 40 which is a member used for mounting the transponder. Thereby, a uniformity performance of the tire can be enhanced. Moreover, the section of the string-shaped projection member 40 from the fall-out prevention portion 43 to a tip (a free edge) of the string-shaped projection member 40 is made loner than the thickness of the transponder 1A. Thus, mounting workability for the transponder 1A can be made favorable.

Figure 11:
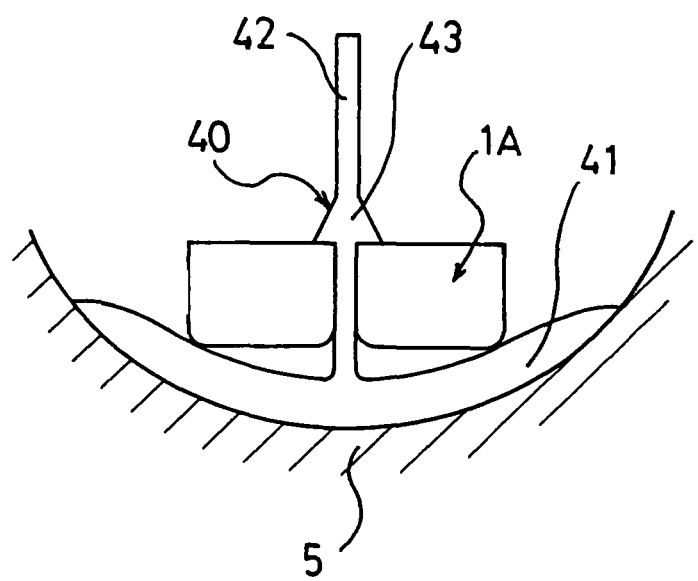
FIG. 11 is an enlarged view of a cross-sectional view in the direction of the tire diameter, the view showing a state where the transponder is mounted in a state where the tire is deformed.

As shown in an enlarged partial view of FIG. 11 of the cross section in the direction of the tire diameter, even in a case where the transponder 1A is installed in a heavily-load vehicle which travels at a high speed, when the string-shaped projection member 40 is formed of an elastically expandable and contractible elastic material such as elastomer, deformation of the tire, especially deformation of the inner liner 5 to which the string-shaped projection member 40 is fixed with the patch portion 41, can be absorbed by elongation of the string-shaped projection portion 42. Hence, a risk of the transponder 1A falling off is reduced.

Figure 12:
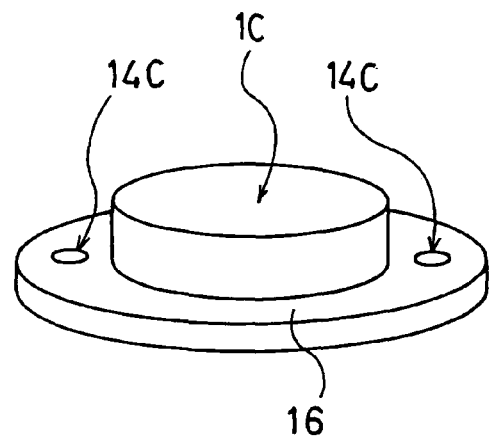
FIG. 12 is a perspective view of a transponder of a fifth embodiment.
Figure 13:
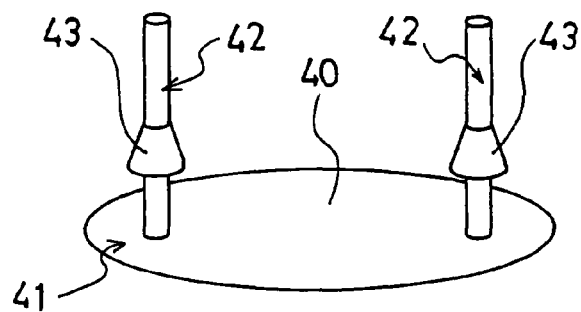
FIG. 13 is a perspective view of a string-shaped projection member for transponder mounting of the fifth embodiment.

The transponder 1C of the fifth embodiment is shown in the perspective view of FIG. 12. This transponder 1C is identical to the transponder of the fourth embodiment in that it is formed with the antenna coil 11 and the chip 10 covered by the coating resin 13. However, a difference is that a flange portion 16, which is made of synthetic resin, provided to the transponder 1C, and that a pair of through holes 14C, 14C are provided in the flange portion 16. A pair of string-shaped projection portions 42 are provided, and are formed on the string-shaped projection member 40 respectively corresponding to the pair of through holes 14C as shown in the perspective view of FIG. 13. Note that a section of the string-shaped projection portion 42 from the fall-out prevention portion 43 to a tip (a free edge) of the string-shaped projection portion 42 is preferably made longer than a thickness of the flange portion 16 of the transponder 1C.

Figure 14:
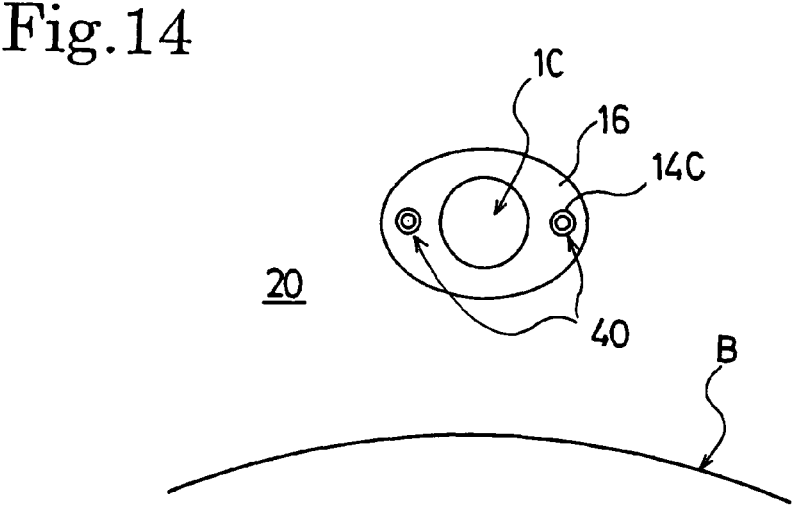
FIG. 14 is a view showing a state where the transponder of the fifth embodiment is mounted, the view being viewed in a downward direction toward the string-shaped projection portions.

Subsequently, as shown in an enlarged partial view of FIG. 14 as viewed in a downward direction toward the string-shaped projection portions 42, the string-shaped projection portions 42 are passed through the respective through holes 14C of the transponder 1C. The transponder 1C is then pushed toward the patch 41 beyond the fall-out prevention portion 43. Thereby, the transponder 1C is secured between the fall-out prevention portion 43 and the patch portion 41. In this case, considering that an amount of deformation of the tire in a direction perpendicular to the bead toe B is large, it is preferable that the pair of string-shaped projection members 40 be provided in a way that the string-shaped projection members 40 are aligned parallel to each other in the direction of tire circumference, that is, in a direction of the bead toe B.

With this configuration, even in a case of installing the transponder 1C in a heavily-load high-speed traveling vehicle, the transponder 1C can be secured in a way that the transponder 1C moves easily along with a large deformation of the tire due to a heavy load thereto. The reason is that the through holes 14C exist respectively at two locations, and the string-shaped projection portions 42 of the transponder 1C also exist respectively in two locations. Accordingly, a risk of the transponder 1C falling off can be further reduced.

Figure 15:
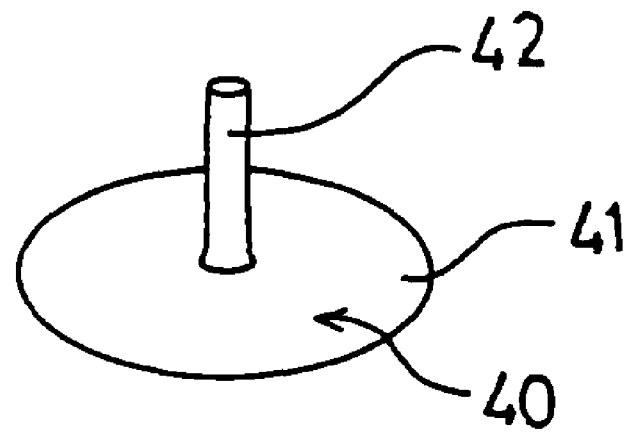
FIG. 15 is a perspective view of a string-shaped projection member for mounting a transponder of a sixth embodiment.

In the sixth embodiment, as in the case with the fourth embodiment, the transponder 1A is formed with the antenna coil 11 and the chip 10 covered by the coating resin 13. The transponder 1A has the through hole 14A at the center thereof. Meanwhile, the string-shaped projection member 40 is formed of a thermoplastic elastomer material. As shown in the FIG. 15, the string-shaped projection portion 42 protruding from the patch portion 41 is formed in a way that an outer diameter of the string-shaped projection portion 42 is smaller than the inner diameter of the through hole 14A. Moreover, the string-shaped projection portion 42 is made longer than the thickness of the transponder 1A. Incidentally, in this sixth embodiment, the fall-out prevention portion 43 is not provided to the middle of the string-shaped projection portion 42.

Here, the thermoplastic elastomer means a high-polymer material which can be processed by heating because it shows rubber elasticity at room temperature, and plasticizes at a high temperature. As this thermoplastic elastomer, for example, a high-polymer material which is olefin-based, styrene-based, ester-based, urethane-based, amide-based, vinyl-chloride-based or the like can be used as appropriate. Furthermore, by blending one polymer material with another, it is also possible to impart larger rubber elasticity thereto, and to improve a physical characteristic such as thermal resistance.

Figure 16:
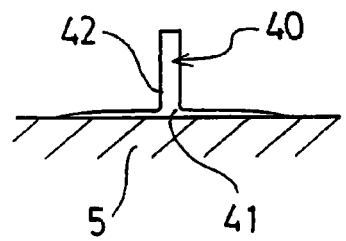
FIG. 16 is a view showing a first step of mounting a transponder of the sixth embodiment.
Figure 17:
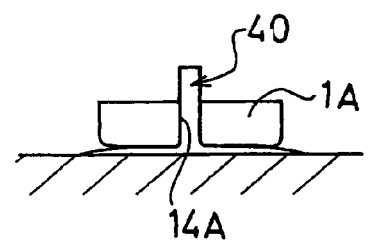
FIG. 17 is a view showing a second step of mounting the transponder of the sixth embodiment.
Figure 18:
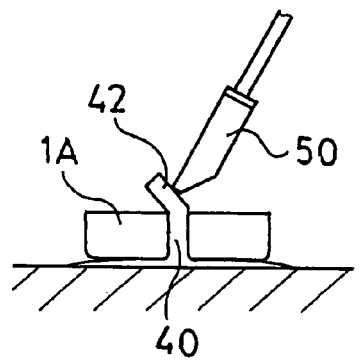
FIG. 18 is a view showing a third step of mounting the transponder of the sixth embodiment.
Figure 19:
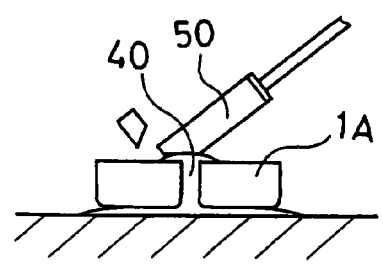
FIG. 19 is a view showing a fourth step of mounting the transponder of the sixth embodiment.
Figure 20:
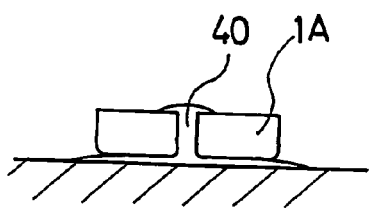
FIG. 20 is a view showing a fifth step of mounting the transponder of the sixth embodiment.
Figure 21:
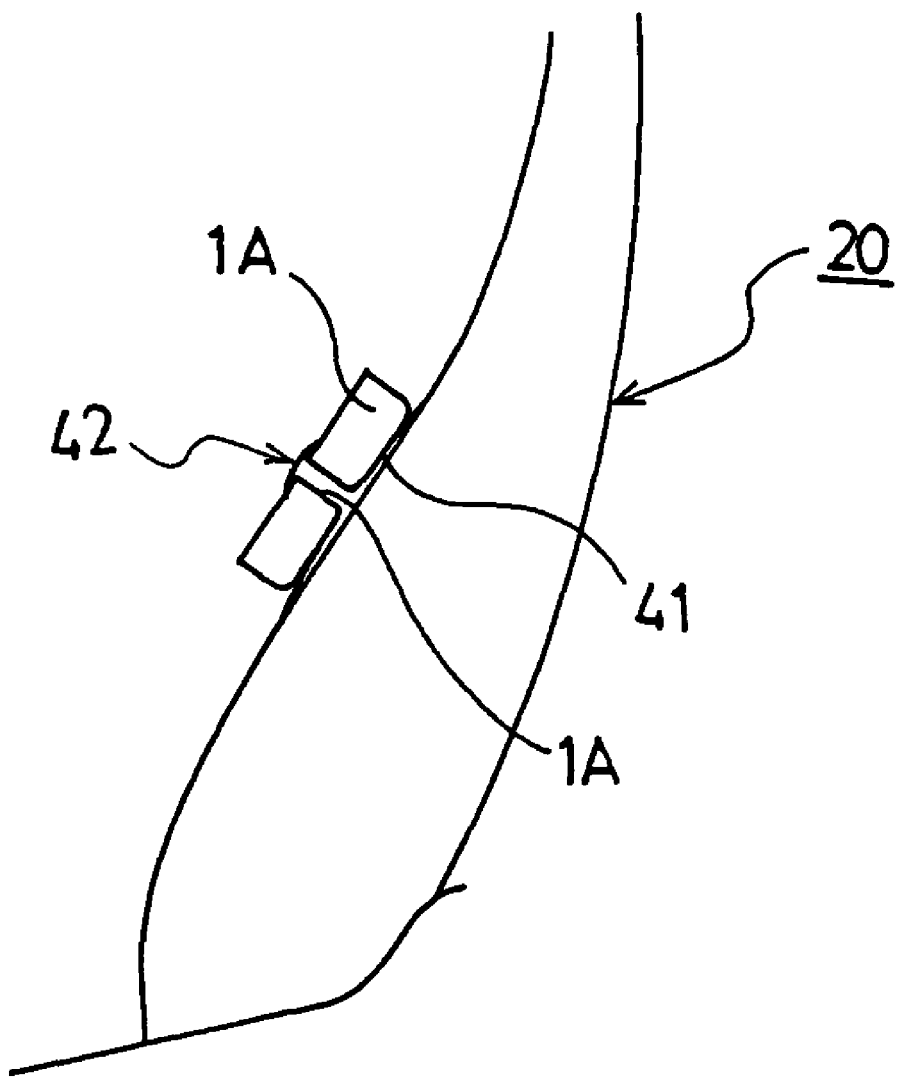
FIG. 21 is a view showing a state where the transponder of the sixth embodiment is mounted.

Through mounting steps as shown in FIGS. 16 to 20, the transponder 1A is mounted on the pneumatic tire 20 as shown in FIG. 21. FIG. 16 shows a state where the string-shaped projection member 40 is fixed to the inner liner 5 with the patch portion 41. As shown in FIG. 17, this string-shaped projection member 40 is inserted into the through hole 14A of the transponder 1A. Then, a heating apparatus 50 such as an iron is applied to a tip of the string-shaped projection portion 42 of the string-shaped projection member 40 as shown in FIGS. 18 and 19. After that, the tip of the string-shaped projection portion 42 is deformed by heating into a bump shape that is used to prevent the transponder from falling off, as shown in FIG. 20. Thereby, the transponder 1A is grasped.

Figure 22:
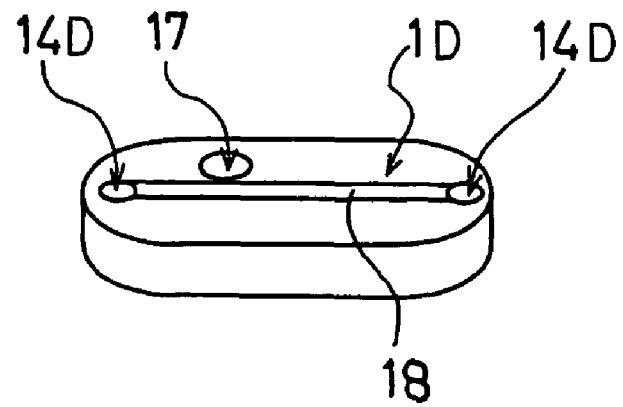
FIG. 22 is a perspective view of a transponder of a seventh embodiment.

In the seventh embodiment, as shown in the perspective view of FIG. 22, a transponder 1D is formed with the antenna coil 11 and the chip 10 covered with the coating resin 13, and has a pair of through holes 14D on both sides thereof. This transponder 1D of the FIG. 22 includes a pressure sensing device 17 for pneumatic-pressure located off center, and a groove 18 formed along a line in the center thereof.

Figure 23:
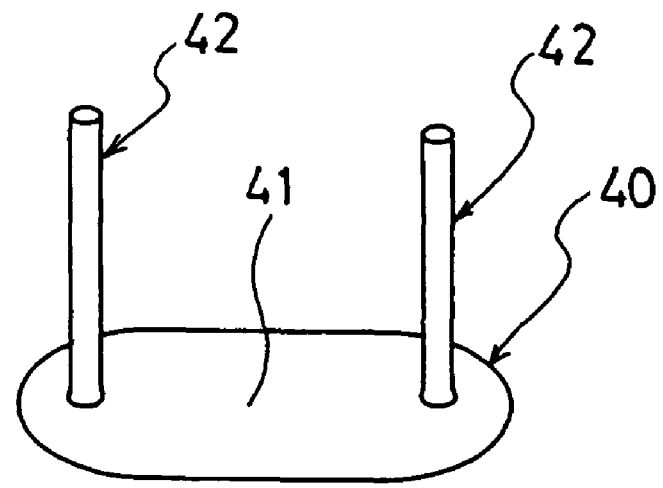
FIG. 23 is a perspective view of a string-shaped projection member for mounting a transponder of the seventh embodiment.

Meanwhile, the string-shaped projection member 40 is formed of a thermoplastic elastomer material. As shown in the perspective view of the FIG. 23, the two string-shaped projection portions 42 are molded integrally with the patch portion 41. In addition, the string-shaped projection portion 42 protruding from the patch portion 41 is formed to have the outer diameter thereof smaller than the inner diameter of the through hole 14D, and to be longer than a sum of the thickness and the radius of the transponder 1D. Incidentally, in this seventh embodiment, the fall-out prevention portion 43 is not provided to the middle of the string-shaped projection portion 42.

With this configuration, the string-shaped projection portions 42 formed of the thermoplastic elastomer material can be placed in the groove 18. Thereby, in such cases as where the tire is detached or attached, a risk of the string-shaped projection portions 42 being rubbed and cut off can be reduced.

Figure 24:
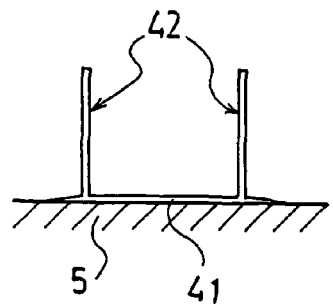
FIG. 24 is a view showing a first step of mounting a transponder of the seventh embodiment.
Figure 25:
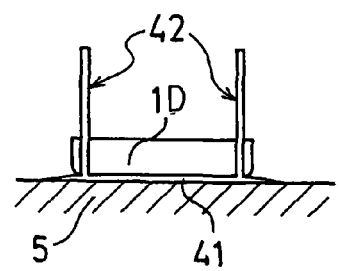
FIG. 25 is a view showing a second step of mounting the transponder of the seventh embodiment.
Figure 27:
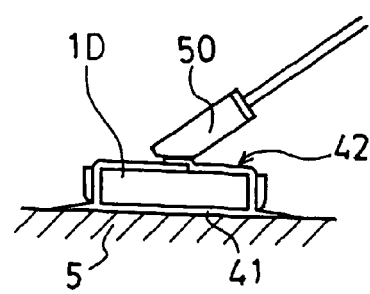
FIG. 27 is a view showing a fourth step of mounting the transponder of the seventh embodiment.
Figure 28:
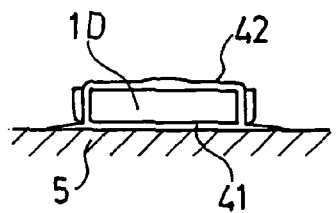
FIG. 28 is a view showing a fifth step of mounting the transponder of the seventh embodiment.
Figure 29:
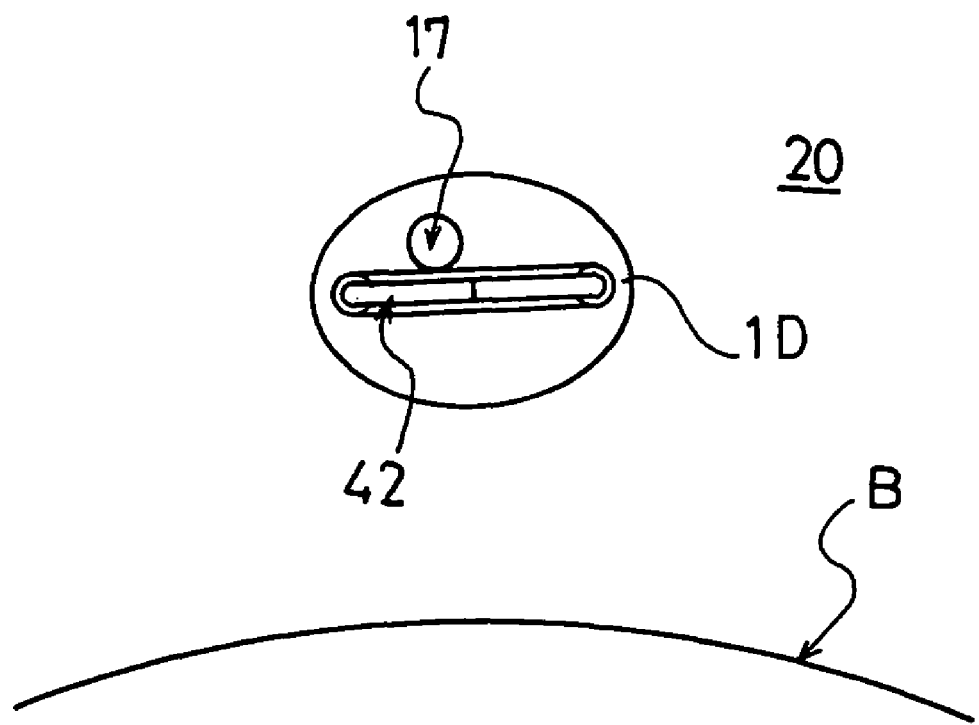
FIG. 29 is a view showing a state where the transponder of the seventh embodiment is mounted.

Through mounting steps as shown in FIGS. 24 to 28, the transponder 1D is mounted on the pneumatic tire 20 as shown in FIG. 29. FIG. 24 shows a state where the string-shaped projection member 40 is fixed to the inner liner 5 by the patch portion 41. As shown in FIG. 25, the string-shaped projection portions 42 of the string-shaped projection member 40 are inserted through the through holes 14D of the transponder 1D.

Figure 26:
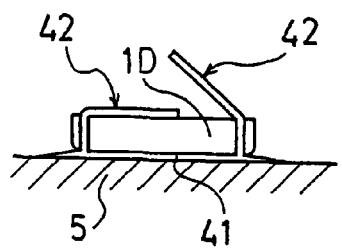
FIG. 26 is a view showing a third step of mounting the transponder of the seventh embodiment.

Subsequently, as shown in FIG. 26, tip sides of the respective string-shaped projection portions 42 are folded inside the groove 18 to be overlapped with each other. Next, the heating apparatus 50 such as an iron is applied to the overlapped parts as shown in FIG. 27, and the overlapped parts of the respective string-shaped projection portions 42 are joined to each other by thermal fusion as shown in FIG. 28. Thereby, the transponder 1D is grasped.

With this configuration, the string-shaped projection portions 42 of the respective string-shaped projection member 40 for mounting the transponder 1D can be thermally fused with each other. Hence, the transponder 1D can be strongly fixed, and a risk of the transponder 1D falling off can be reduced as a result.

Incidentally, when the string-shaped projection member 40 is formed of PP (polypropylene) or EPDM (polyolefin), it is made easily possible to cut the string-shaped projection portion 42 by melting by use of the heating apparatus 50 such as an electrically-heated iron, and to provide a ball-shaped projection on a fractured surface. Thus, it is made possible to fix the transponder 1D to the tire more reliably. Additionally, it is made easily possible to thermally fuse a plurality of stripe-shaped projection portions 42 with one another.

Hence, according to the aforementioned pneumatic tire 20 and a method of mounting the transponder 1, 1A, 1B, 1C or 1D on the pneumatic tire 20, any one of the transponders 1, 1A, 1B, 1C or 1D can be reliably secured. Additionally, not only that, the transponder 1, 1A, 1B, 1C or 1D can be fixed inside the tire exposed to extremely severe dynamic deformation, in a state where each of the transponders can allow the tire deformation, that is, in a state where each of the transponders easily follows the dynamic deformation of the tire.

Moreover, weights of the transponder 1, 1A, 1B, 1C or 1D and those of the respective members 3, 3A or 40 for securing the transponder 1, 1A, 1B, 1C or 1D can be remarkably reduced. Additionally, even in a large tire, the transponder 1, 1A, 1B, 1C or 1D, and the members 3, 3A or 40 for securing the transponder 1, 1A, 1B, 1C or 1D can be prevented from generating or accumulating much heat, and reduction in loading durability performance can be suppressed to the minimum.

A transponder circuit and a cabinet of the transponder, of which hardness is quite different from that of the tire, need not be bonded to the tire directly. Accordingly, it is not necessary to concern over bonding failure. Moreover, the transponder 1A, 1C or 1D can be flexibly mounted by taking advantage of an elongation property of the string-shaped projection member 40.

Example 1

As Example 1 of the pneumatic tire of the first embodiment, the securing screw member 3 having the male screw M was fixed with the patch 2 to a location 40 mm away from the bead toe A toward an outer circumference of the tire as shown in FIG. 1. As shown in FIG. 2A, the cylindrical transponder 1 which has an outer diameter of 20 mmΦ and a thickness of 3 mm was screwed to this male screw M by use of screws respectively of the transponder 1 and of the mail screw M. In this manner, 20 units of the pneumatic tires 20 of 11R22.5 16PR having a pattern for traveling on a general paved road were prepared.

Note that this transponder 1 is provided with the female screw F at the center thereof, on an inner surface of the through hole 14 having an outer diameter of 3 mmΦ, and is covered with bisphenol A type epoxy resin having a Shore D hardness of 96, and a decomposition-start temperature of 300° C.

Figure 30:
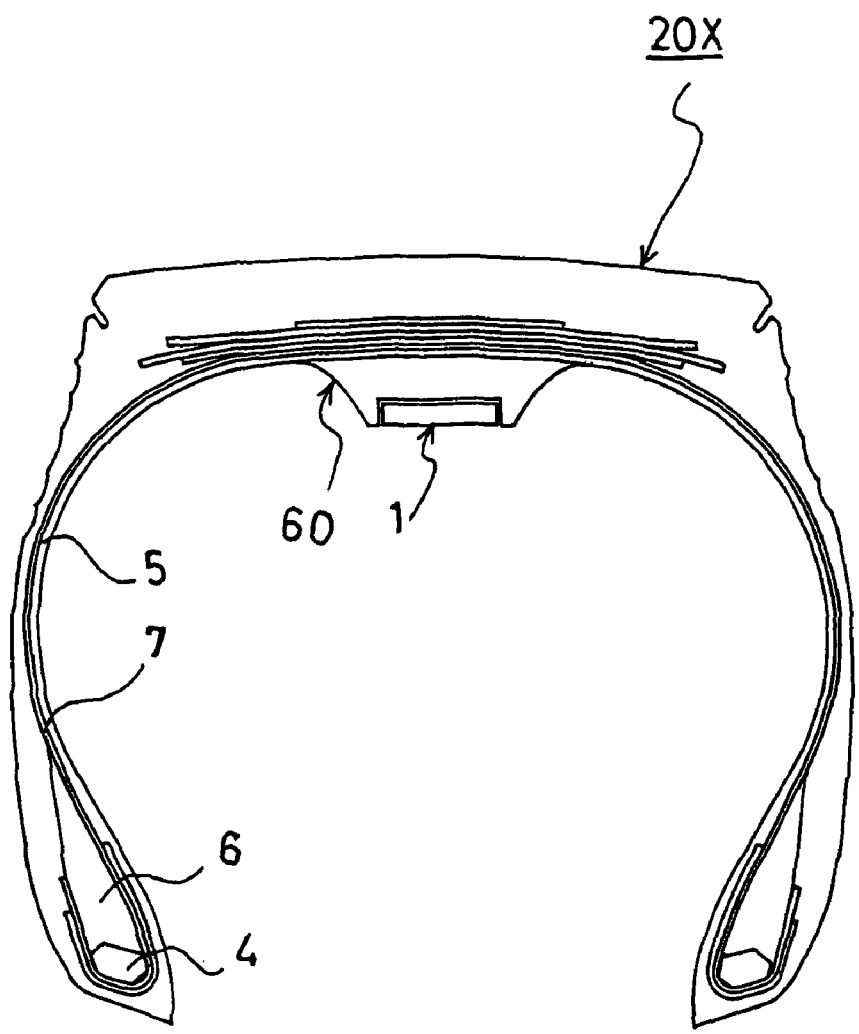
FIG. 30 is a cross-sectional view of a tire in a diametrical direction thereof, the view showing a configuration of the mounting of a transponder on a pneumatic tire by a conventional art.

Moreover, a large housing 60 configured to embrace the transponder 1 as in Example 1 was provided to an equatorial plane of the tire of the conventional technology shown in FIG. 30. Thereby, 20 units of pneumatic tires 20X are prepared for experimentation as Conventional Example 1.

Thereafter, tests for comparing uniformity, dynamic balance amounts and loading durability performance were carried out for these two types of pneumatic tires 20 and 20X.

In these tests, each of test tires was mounted on a wheel of a rim size of 22.5×8.25 with a pneumatic pressure of 800 kPa. Assessment results are respectively shown in index numbers where each of assessment results obtained from the 20 units of the pneumatic tires 20X of the conventional example is set at 100. In each of the pneumatic tires 20X, the transponder 1 was embraced on the equatorial plane of the tire. Note that each of the same pneumatic tires 20 or 20X was caused to travel in conditions where the initial load thereon was 3000 kg, and where a speed thereof was 80 km/h, while the load thereon was increased by 150 kg every hour. The loading durability performance was assessed in this manner until the transponder 1 or the tire 20 or 20X was destroyed.

TABLE 1

| | Test results | |
|---|---|---|
| | Conventional Example 1 | Example 1 |
| Uniformity (RVF) | 100 | 95 |
| Dynamic balance correction weight | 100 | 90 |
| Loading durability performance | 100 | 95 |

Numbers are respectively shown in index numbers where each of the results of the conventional example is expressed as 100. A smaller value indicates a more favorable case.

According to Table 1 showing the assessment results on uniformity, dynamic balance amounts and loading durability performance of Example 1 and of Conventional Example 1, each of the pneumatic tires 20 of Example 1 is found superior to the pneumatic tire 20X of Conventional Example 1 in all of these types of performance.

Example 2

Figure 7:
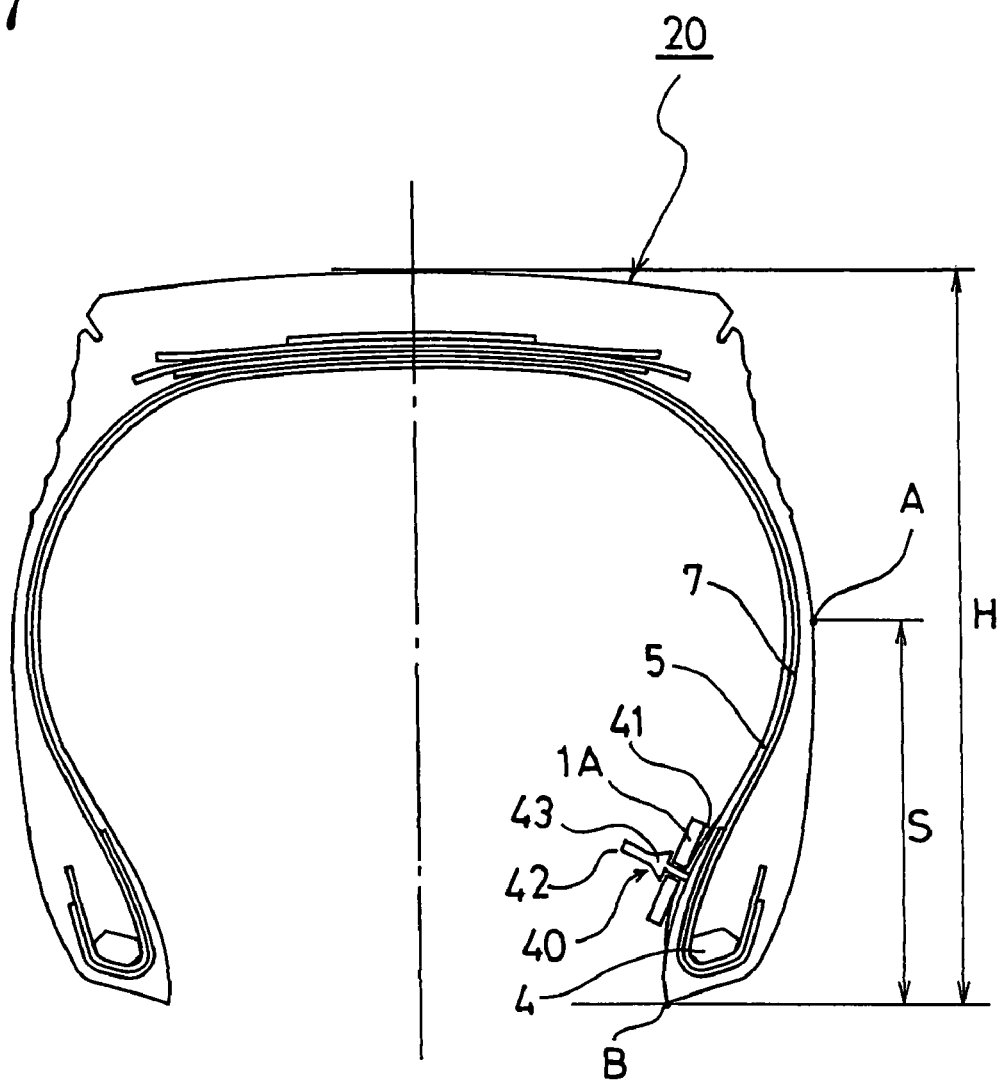
FIG. 7 is a cross-sectional view of a tire in a diametrical direction thereof, the view showing a configuration of a pneumatic tire of a fourth embodiment of the present invention.

As Example 2 of the pneumatic tire of the fourth embodiment, the string-shaped projection portion 40 was fixed to a location 40 mm away from the bead toe B toward an outer circumference of the tire as shown in FIGS. 7 and 10. An outer diameter of the bottom edge of the truncated-cone shape of the fall-out prevention portion 43 was set at 4 mm, the fall-out prevention portion 43 being provided 3 mm away from a patch portion 31 of the string-shaped projection portion 40.

The transponder 1 shown in FIG. 8 was formed to have an outer diameter of 20 mmΦ and a thickness of 3 mm, and was provided with the through hole 14A at the center thereof, the through hole 14A having an outer diameter of 3 mmΦ. In this manner, the pneumatic tire 20 of 11R22.5 16PR having a pattern for traveling on a general paved road was prepared. Note that this transponder 1 was formed of a material having a Shore D hardness of 96, and was covered with bisphenol A type epoxy resin having a decomposition-start temperature of 300° C.

Figure 31:
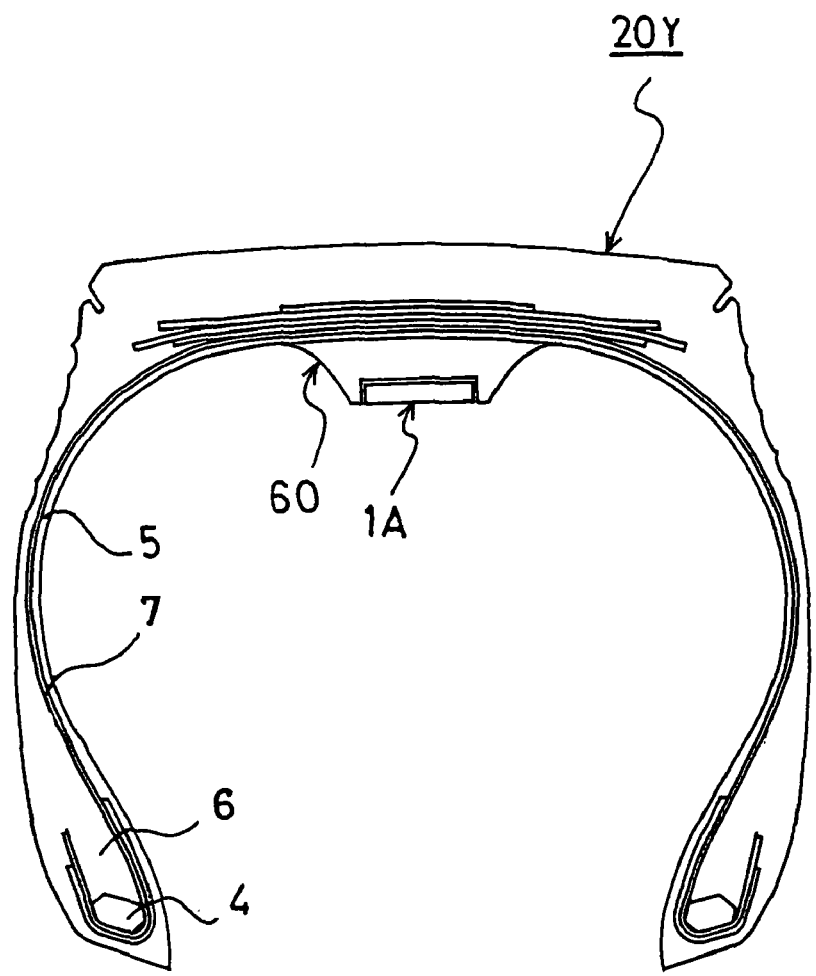
FIG. 31 is a cross-sectional view of a tire in a diametrical direction thereof, the view showing a configuration of the mounting of a transponder on a pneumatic tire of Conventional Example 2.

Moreover, a grasping member (a housing) 60 for grasping the transponder 1A with a configuration identical to that shown in FIG. 8, was provided, and the transponder 1A was placed in the position identical to that shown in FIG. 31. Accordingly, a pneumatic tire 20Y was prepared for experimentation as Conventional Example 2.

Subsequently, tests for uniformity, for comparison of dynamic balance correction amounts and for loading durability performance were carried out for both of the tires 20 and 20Y. In the uniformity test, measurements were made in compliance with JASOC607 "Method for testing the uniformity of tires for cars." Measurement conditions were set referring to the year 2003 version of JATMA. Additionally, in the loading durability performance test, radio waves transmitted by the transponders 1A inside the tires ware compared with one another every 30 minutes. Test results are respectively shown in index numbers where a time period to the point where the transponder 1A of the pneumatic tire 20Y of Conventional Example is unable to communicate. Specifically, after the completion of the durability test with a drum diameter of 1707 mm, with JIS D-4230 and with a load defined in the year 2003 JATMA, the loading durability performance was tested by causing each of the tires to continue traveling under the same conditions as those in the durability test.

TABLE 2

Test results

|  | Conventional Example 2 | Example 2 |
| --- | --- | --- |
| Uniformity (RVF) | 100 | 95 |
| Dynamic balance correction weight | 100 | 90 |
| Loading durability performance | 100 | 95 |

Numbers are respectively shown in index numbers where each of the results of the conventional example is expressed as 100. A smaller value indicates a more favorable case.

According to Table 2 showing assessment results on uniformity, dynamic balance amounts and loading durability performance of Example 2 and of Conventional Example 2, the pneumatic tire 20 of Example 2 is found superior to the pneumatic tire 20X of Conventional Example 2 in all of these types of performance.

INDUSTRIAL APPLICABILITY

The present invention can exert the following effects. A large centrifugal force and a large impact force can be prevented from acting upon the transponder mounted on a pneumatic tire. The weight of a transponder for storing various pieces of information and that of a member for securing the transponder can be remarkably reduced. Thereby, a dynamic balance of the tire can be corrected easily while uniformity of the tire is enhanced. Additionally, even in a case of a large tire, reduction in durability of the member for securing the transponder can be suppressed to the minimum. Accordingly, the present invention can be applied to a pneumatic tire used for a passenger car as well as a large tire used for a large car.

What is claimed is:

1. A pneumatic tire on which a transponder is mounted, wherein a securing member for securing the transponder is fixed to an inner surface of the tire in an area between a maximum-width position of the tire and a bead toe, wherein at least a first portion of the securing member is located on an inner side of the inner surface of the tire and at least a second portion of the securing member is located on a corresponding outer side of the inner surface of the tire, such that said securing member extends through the inner surface of the tire.

2. The pneumatic tire according to claim 1, wherein the securing member is formed of a securing screw member.

3. The pneumatic tire according to claim 2, wherein the transponder is secured to the securing screw member by screwing a male screw, which is formed in the securing screw member, into a female screw which is a through hole formed in the transponder.

4. The pneumatic tire according to claim 2, wherein the transponder is secured to the securing screw member by screwing a male screw, which is formed in a screw portion, into a female screw which is formed in the securing screw member, the screw portion being provided to a bottom surface of the transponder in a way that the screw portion projects.

5. A pneumatic tire on which a transponder is mounted, wherein a securing member for securing the transponder is fixed to an inner surface of the tire in an area between a maximum-width position of the tire and a bead toe,
wherein the securing member is formed of a securing screw member, and
wherein the transponder is secured to the securing screw member by inserting a mounting screw member through a through hole formed in the transponder, and by screwing together the mounting screw member and the securing screw member.

6. The pneumatic tire according to any one of claims 2 to 4, wherein a material of a portion where any one of the male screw and the female screw is formed is made of any one of metal, resin or fiber-reinforced plastic having any one of a melting point and a softening point of not less than 180° C.

7. The pneumatic tire according to claim 5, wherein the securing screw member is mounted on an inner surface of an unvulcanized tire with a patch of unvulcanized rubber, and is fixed to the tire with the patch being fixed to the inner surface of the tire along with vulcanization of the tire.

8. The pneumatic tire according to claim 5, wherein the securing screw member is mounted on an inner surface of a vulcanized tire with a patch of any one of unvulcanized rubber and vulcanized rubber, and is fixed to the tire with the patch being fixed to the inner surface of the tire along with vulcanization of the tire.

9. The pneumatic tire according to claim 1, wherein the securing member is formed of at least one string-shaped projection member for securing a transponder having a through hole.

10. The pneumatic tire according to claim 9, wherein
the string-shaped projection member is formed by integral molding with a patch portion and a string-shaped projection portion which protrudes from the patch portion,
the patch portion is previously secured to an inner liner of the pneumatic tire, and
a tip of the string-shaped projection portion is caused to protrude from the tire inner surface.

11. The pneumatic tire according to any one of claims 9 and 10, wherein,
an outer diameter of the string-shaped projection portion is formed to be smaller than the through hole of the transponder, and
a fall-out preventing portion, which expands and contracts due to elastic deformation, is provided to the string-shaped projection portion.

12. The pneumatic tire according to any one of claims 9 and 10, wherein the string-shaped projection member is formed of elastomer.

13. The pneumatic tire according to any one of claims 9 and 10, wherein
the string-shaped projection member is formed of thermoplastic elastomer, and
the string-shaped projection portion is deformed by heating after being passed through the through hole of the transponder.

14. The pneumatic tire according to any one of claims 1 to 4, and 9 and 10, wherein a communication frequency of the transponder is set at not less than 300 MHz and not more than 3 GHz.

15. The pneumatic tire according to any one of claims 3 to 4, wherein the securing screw member is buried inside the tire at the time of vulcanization of the tire.

16. A pneumatic tire on which a transponder is mounted, wherein a securing member for securing the transponder is fixed to an inner surface of the tire in an area between a maximum-width position of the tire and a bead toe,
wherein the securing member is formed of a securing screw member,
wherein a fall-out preventing member is provided to an end portion of the screw of the securing screw member, the end portion being opposite to a tip of the securing screw member,
wherein the fall-out preventing member of the securing screw member is fixed to an area between an tire inner surface and a surface of a bead filler at the side of a carcass.

17. A pneumatic tire on which a transponder is mounted, wherein a securing member for securing the transponder is fixed to an inner surface of the tire in an area between a maximum-width position of the tire and a bead toe,
wherein the securing member is formed of a securing screw member,
wherein the securing screw member is buried inside the tire at the time of vulcanization of the tire.

18. The pneumatic tire according to any one of claims 2 to 4, wherein a fall-out preventing member is provided to an end portion of the screw of the securing screw member, the end portion being opposite to a tip of the securing screw member.

19. A pneumatic tire on which a transponder is mounted, wherein a securing member for securing the transponder is fixed to an inner surface of the tire in an area between a maximum-width position of the tire and a bead toe,
wherein the securing member is formed of at least one string-shaped projection member for securing a transponder having a through hole,
wherein at least two of the string-shaped projection portions are placed, are passed through the respective through holes, are then caused to overlap with each other, and are heated to be fused with each other by use of a heating apparatus.

20. The pneumatic tire according to claim 19, wherein
a groove portion is provided to the transponder,
the string-shaped projection portions after being passed through the respective through holes of the transponder are arranged inside the groove portion, and are caused to overlap with each other, and
the overlapped portions are heated to be fused with each other by use of a heating apparatus.

* * * * *